April 12, 1932.  H. T. HUNTER  1,854,034
BAKING OVEN
Filed April 26, 1930  3 Sheets-Sheet 1
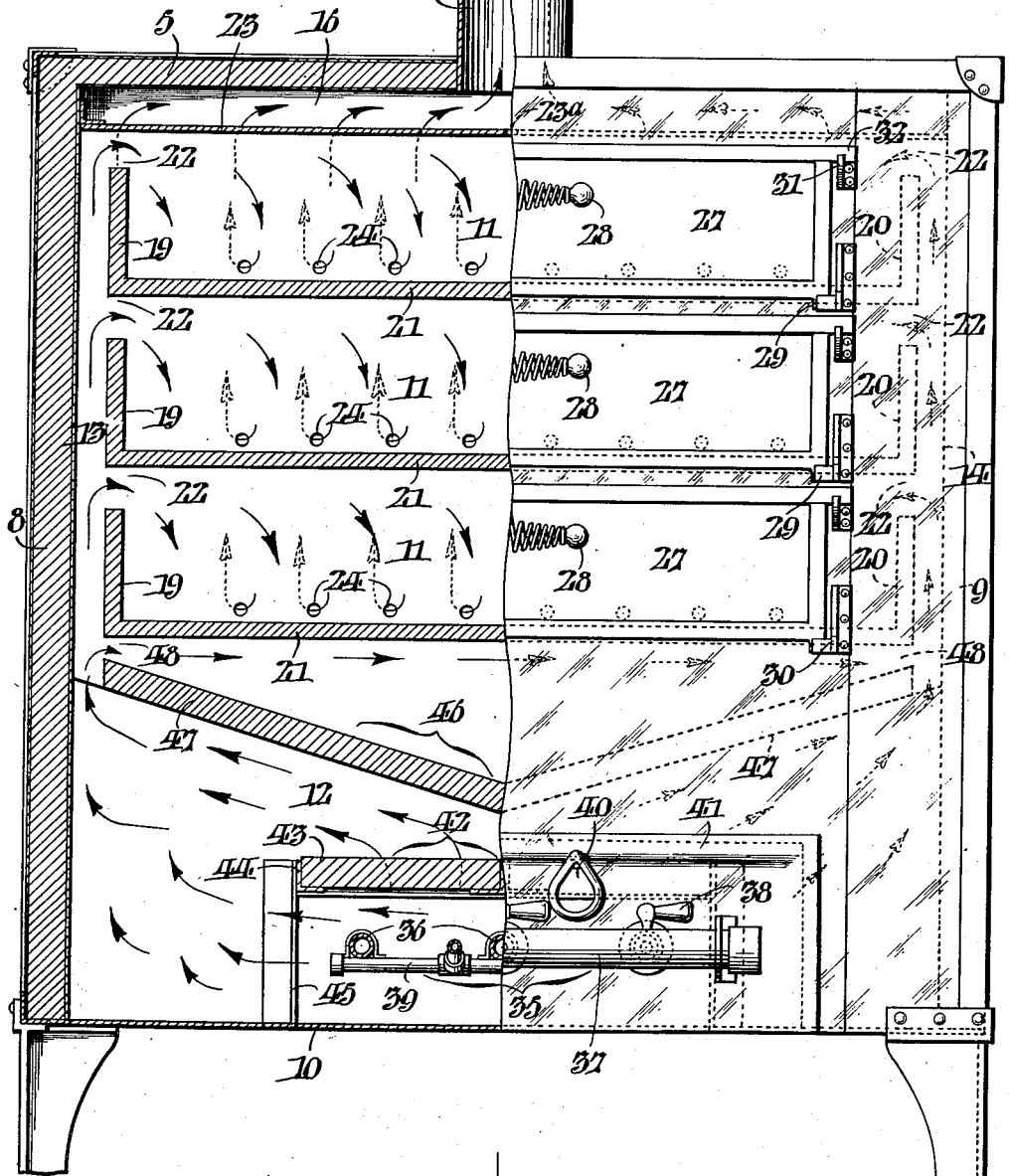
FIG. I.
WITNESSES
John A. Weidler
George M. Muschamp
INVENTOR:
Herbert T. Hunter,
BY
ATTORNEYS.

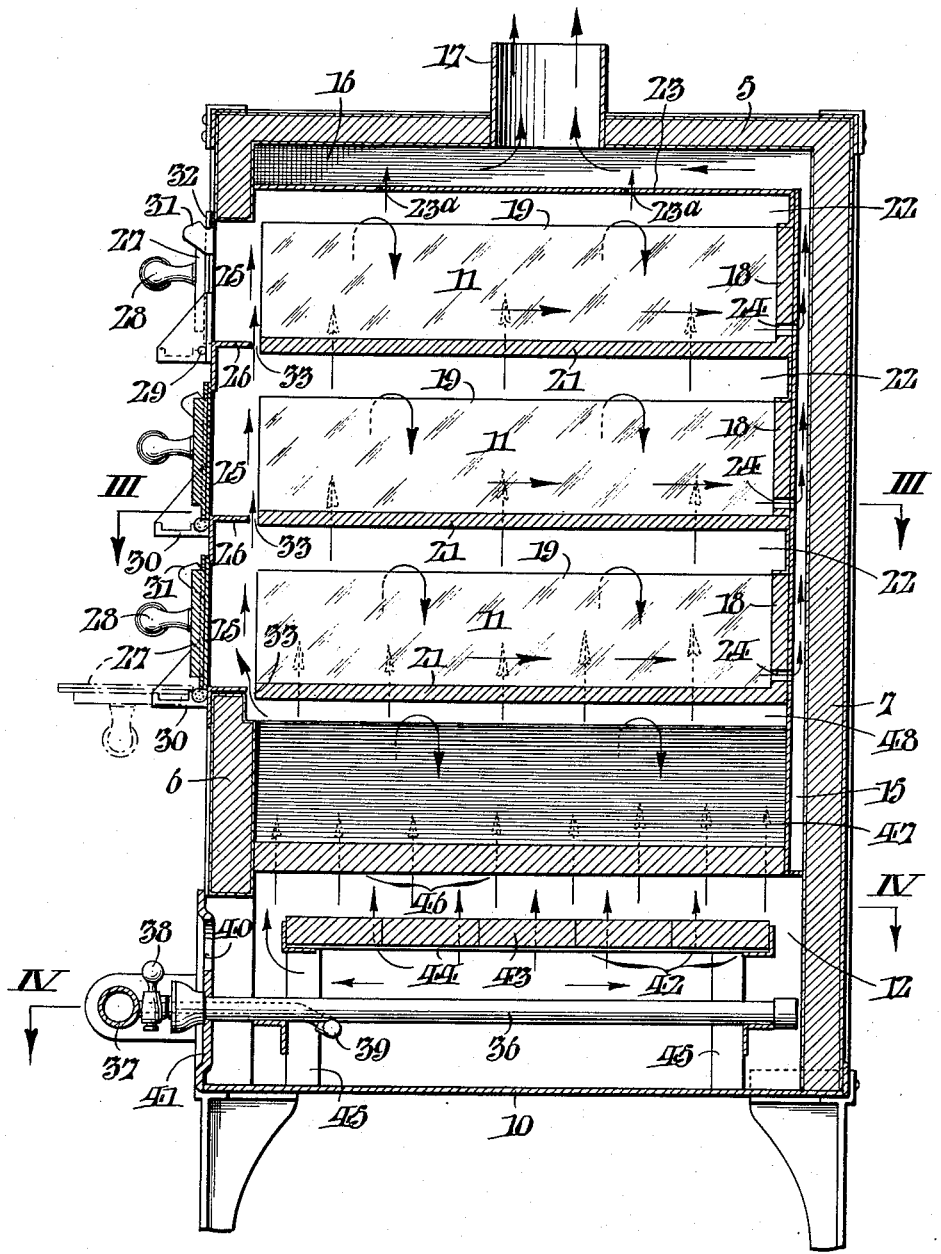

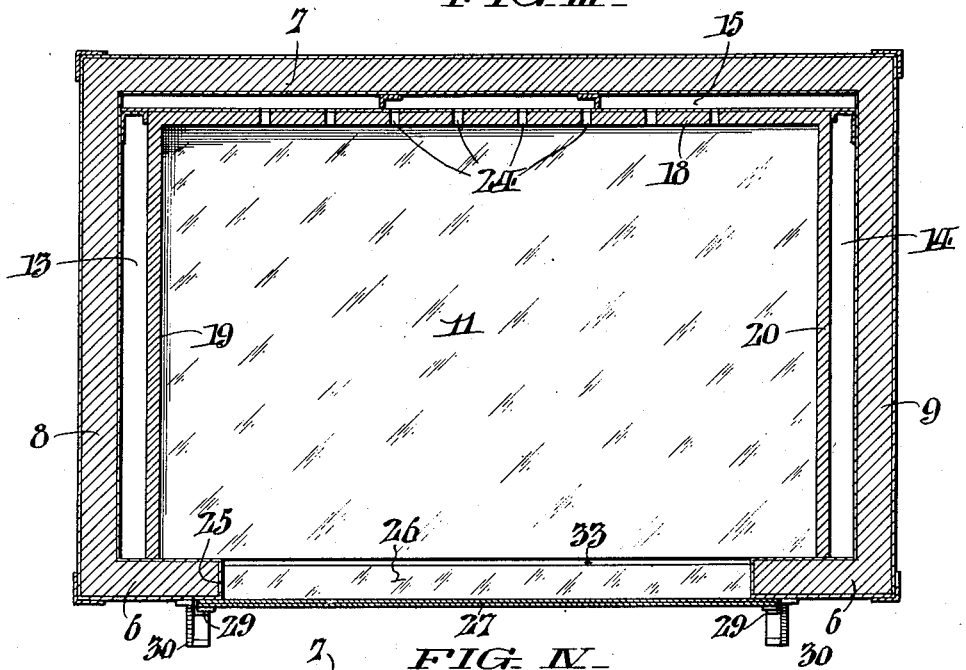
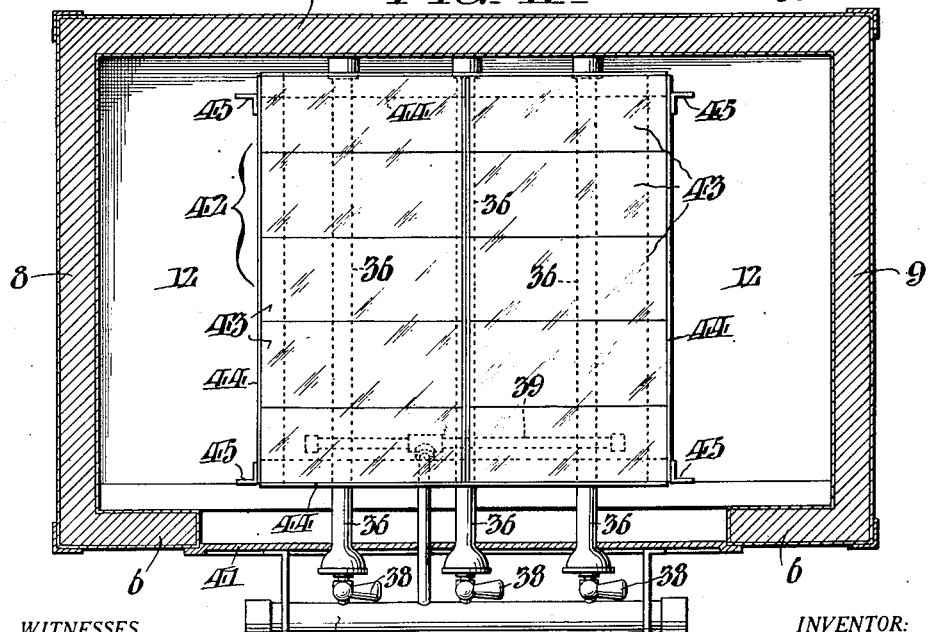

Patented Apr. 12, 1932

1,854,034

UNITED STATES PATENT OFFICE

HERBERT T. HUNTER, OF BALTIMORE, MARYLAND, ASSIGNOR TO DOUGHNUT MACHINE CORPORATION, OF NEW YORK, N. Y., A CORPORATION OF NEW YORK

BAKING OVEN

Application filed April 26, 1930. Serial No. 447,447.

This invention relates to baking ovens; and has more particular reference to ovens of a type wherein a multiplicity of baking compartments with individual frontal access doors are arranged in superposed relation above a bottom heating compartment.

In connection with ovens of the specific type referred to, I aim to maintain like thermal conditions in the several superposed baking compartments through equalized apportionment of heated air to them from the underlying heating compartment.

Another object of my invention is to insure that the baking compartments are completely traversed by the heated air through induction of the air into the said compartments laterally from several different directions.

My invention is also in part directed toward offsetting thermal losses when the doors of the baking compartments are opened by diverting some of the heated air from the bottom compartment to pass in the form of a sheet-like screen crosswise of the fronts of the baking compartments and thereby act as a barrier for the purpose indicated.

A further object of my invention is to secure the foregoing desiderata with attainment of the utmost efficiency from the fuel consumed incident to operation of the oven.

Still other objects and attendant advantages will be manifest from the detailed description following in coordination with the attached drawings, whereof Fig. I is partly a front elevation and partly a longitudinal sectional view of a baking oven conveniently embodying my invention.

Fig. II is a cross sectional view of the oven taken as indicated by the arrows II—II in Fig. I.

Fig. III is a plan sectional view through one of the baking compartments of the oven taken as indicated by the arrows III—III in Figs. I and II; and, Fig. IV is a plan section through the heating compartment of the oven taken as indicated by the arrows IV—IV in Fig. II.

As herein delineated, the oven of my invention is in the form of a rectangular enclosure with top 5, front and back walls 6, 7, and end walls 8, 9, all constructed from thermo insulation and preferably covered both exteriorly and interiorly with sheet metal; while its bottom 10 is constructed solely from sheet metal. The structure is internally subdivided to afford a multiplicity of separate baking compartments 11 in superposed relation above a bottom heating compartment 12; identically-proportioned narrow vertical end passages 13, 14 for conducting heated air from the bottom compartment 12 to the several baking compartments 11; and a narrow vertical passage 15 at the back for conducting heated air exhausted from said baking compartments 11, to a horizontal top space 16 which in turn discharges into a centrally disposed upward flue 17, the passage 15 being shut off at the bottom from communication with the compartment 12, see Fig. II.

The rear wall 18, end walls 19, 20 and bottoms 21 of the baking compartments 11 are of heat resistant material such, for example, as asbestos cement sheeting; and it will be especially observed that the compartments 11 communicate with the vertical flow passage 13, 14 at opposite ends of the structure by way of transverse openings or intervals 22 at the tops of their end walls 19, 20. It will be further noted that the bottom 21 of one baking compartment 11 serves as the ceiling of the compartment 11 immediately beneath it, this being true except with regard to the uppermost baking compartment whereof the ceiling is formed by the horizontal partition 23 that sets apart the top space 16 previously referred to. Discharge of heated air from the baking compartments 11 takes place in each instance by way of a series of horizontally aligned apertures 24 in the back wall 18 near the bottom 21; and the uppermost of the baking compartments is afforded additional relief by way of a few small apertures 23a centrally of the diaphragm 23. The baking compartments 11 are individually accessible from the front of the oven through registering openings 25 set apart by spaced horizontal angle bars 26, see Figs. II and III, said openings 25 being somewhat narrower in width than the compartments 11 and protected by doors 27. Each such door 27 is provided with a grasp 28, and is swingable downward about saddle hinges 29 at its lower corners to horizontal position flush with the bottom of the corresponding compartment 11 as shown in dot-and-dash lines in Fig. II, the swing of the door 27 being limited by stops 30 on the oven casing. Incident to opening, the doors 27 are slightly lifted (as permitted by their saddle hinges 29) to clear keepers 31 wherewith lateral projections 32 at the tops of said doors normally engage, see Figs. I and II. For a purpose later on explained, narrow slit-like intervals 33 are left between the angles 26 in the front wall 6 of the oven and the frontal edges of the bottoms 21 of the compartments 11.

Centrally disposed within the bottom compartment 12 is a heating means 35 embodying, in the present instance, a number of tubular gas burners 36 which extend horizontally inwards from a manifold pipe 37 exteriorly of the front of the oven, each such burner being fitted with a control cock 38. As shown, the heating means also embodies a pilot burner 39 which is accessible for lighting through air inlet openings 40 in a face plate 41 at the front of the oven. Immediately above the heating means 35 is a horizontal diaphragm 42 consisting of a layer of fire brick 43 that absorbs and radiates the heat from the gas flames. A frame constructed from horizontal and upright angle bars 44, 45 serves to support the diaphragm 42 at the proper elevation from the bottom 10 of the oven. Also within the heating compartment 12 is a baffle 46 with deflecting segments 47 that incline upwardly at complementary angles from over the central region of the radiating diaphragm 42 toward the vertical passages 13, 14 at the ends of the oven. As shown, the baffle segments 47 terminate short of the bottom 21 of the lowermost baking compartment 11 with provision of intervals 48 through which local circulation of heated air may take place.

In the operation of the oven, the heated air is deflected in laterally opposite directions by the segments 47 of the baffle 46 in the bottom compartment 12, and diverted, with equal division of the flow, to the vertical end passages 13, 14. As the air rises in the passages 13, 14, it finds its way into the several baking compartments 11 by way of the transverse openings 22 in the tops of the end walls 19, 20 of said compartments. As a consequence of impingement of the two opposing lateral streams thus entering each baking compartment 11 from opposite ends, thorough assimilation and distribution are effected, the several compartments being thereby uniformly heated throughout. The described action is to a certain extent promoted through entrance normally of a supplemental flow of the heated air at the fronts of the baking compartments 11 by way of the slit intervals 33, and moreover to prescribed general downward movement and spreading of the air streams due to allocation of the end entrant openings 22 and the discharge outlets 24 in different vertical planes. Upon entering the vertical passage 15 at the rear of the oven and moving upward therein, the heated air serves to warm the back walls 18 of the baking compartments 11, and, in finally traversing the top space 16, imparts warmth to the diaphragm 23 (which constitutes the ceiling of the uppermost baking compartment) before passing out through the flue 17.

Another advantage resulting from the provision of the slit intervals 33 is that, while the doors 27 of the baking compartments 11 are opened for loading or unloading, a thin sheet-like barrier screen of heated air is directed to pass constantly crosswise of the fronts of the compartments 11, thermal losses tending to influence the oven as a whole being in this way effectively minimized.

Having thus described my invention, I claim:

1. An oven in the form of an enclosure affording a multiplicity of separate baking compartments and a heating compartment in superposed relation; passages terminating proximate the top of the oven determining flow of heated air from the heating compartment for induction laterally into the several baking compartments across the width of said compartments from opposite ends, and passages near the baking compartment bottoms for restrictive discharge of the heated air under depressive influence from the rear of said baking compartments.

2. An oven in the form of an enclosure affording a multiplicity of separate baking compartments in superposed relation above a bottom heating compartment, passages terminating proximate the top of the oven determining flow of heated air from said bottom compartment for induction laterally into and across the full top width of the several baking compartments from opposite ends, and aligned outlet passages near the shelf level of the baking compartments for restrictive discharge of the heated air from the rear of said compartments under depressive influence.

3. An oven in the form of an enclosure affording a multiplicity of separate frontally accessible baking compartments in superposed relation above a bottom heating compartment, vertical side passages terminating abruptly proximate the top of the oven determining flow of heated air from said bottom compartment for induction laterally across the full width and at the tops of the several baking compartments through opposite walls, and a passage shut-off with respect to the heating compartment for restricted discharge of the heated air from the bottoms of said baking compartments by way of aligned apertures at the rear thereof.

4. An oven in the form of an enclosure affording a multiplicity of separate frontally accessible baking compartments in superposed relation above a bottom heating compartment, flow passages for heated air leading vertically from the heating compartment in the sides of the oven structure and communicating with the several baking compartments by way of top openings across the full width of the side walls of the latter, and a vertical flue passage in the rear of the structure shut-off at its lower end with respect to the heating compartment and having communication with the several baking compartments by way of aligned openings leading out of the backs of said baking compartments adjacent their bottoms for depressive discharge of the heated air from said baking compartments.

5. An oven in the form of an enclosure affording a multiplicity of separate frontally accessible baking compartments in superposed relation above a bottom heating compartment, vertical flow passages terminating proximate the top of the oven structure for heated air from the bottom heating compartment up the sides of the oven structure and communicating into the baking compartments by way of top openings extending across the full width of the side walls of the latter, and discharge from said compartment through aligned outlets near the bottom of the rear wall; heating means centrally located in the bottom compartment; and deflecting baffle means to divert heated air laterally in opposite directions from said heating means toward the vertical side passages aforesaid, as well as for local circulation below the lowermost baking compartment.

6. An oven in the form of an enclosure affording a multiplicity of separate frontally accessible baking compartments in superposed relation above a bottom heating compartment, vertical flow passages terminating abruptly proximate the top of the oven structure for heated air from the heating compartment up the sides of the oven structure and communicating with the several baking compartments by way of top openings in the side walls of the latter, and discharge from said compartment through aligned rear outlets near the bottoms thereof; heating means centrally located in the bottom compartment; and a baffle embodying upwardly-inclined complementarily-angled sections for diverting air laterally in opposite directions from said heating means toward the vertical end flow passages aforementioned, said baffle being spaced from the bottom of the lowermost baking compartment to afford an interval for local circulation of the heated air below said lowermost baking compartment.

7. An oven in the form of an enclosure affording a multiplicity of separate baking compartments in superposed relation above a bottom heating compartment, vertical flow passages terminating abruptly proximate the top of the oven structure for heated air from the heating compartment up the sides of said structure and communicating with the several baking compartments by way of top openings in the side walls of the latter, and discharge from said compartments through aligned outlets near the bottoms thereof; heating means centrally located in the bottom compartment; a horizontal heat radiating diaphragm over the heating means; and a baffle embodying upwardly-inclined complementarily-angled sections for diverting heated air from the province of the radiating diaphragm laterally in opposite directions toward the vertical flow passages aforesaid, as well as for local circulation below the lowermost baking compartment.

8. An oven in the form of a rectangular enclosure affording a multiplicity of separate baking compartments and a heating compartment in superposed relation, passages determining upward flow of heated air from said heating compartment for induction into and through the several baking compartments from opposing sides at their tops and upwardly across the fronts thereof, and passages near the bottoms of the several baking compartments for conducting away the heated air from the rear side of each said baking compartment.

9. An oven in the form of an enclosure affording a multiplicity of separate baking compartments and a heating compartment in superposed relation, said baking compartments being accessible from the front of the structure and fitted with individual doors; and barriers associated with the individual doors defining narrow intervals whereby heated air from the heating compartment is caused to pass constantly crosswise of the front of the baking compartments, thereby to constitute a sheet-like barrier screen against thermal losses when the doors are opened.

10. An oven in the form of an enclosure affording a multiplicity of separate baking compartments in superposed relation above a bottom heating compartment, said baking compartments being individually accessible through relatively narrower openings set apart by spaced bars, and the bottoms of the baking compartments terminating short of the spaced bars with provision of narrow slits whereby heated air from the heating compartment is directed to pass upward crosswise of the front of the baking compartments, thereby to constitute a barrier against thermal losses when the doors are opened.

In testimony whereof, I have hereunto signed my name at Ellicott City, Maryland, this 22nd day of April, 1930.

HERBERT T. HUNTER.